United States Patent
Leverett

[11] Patent Number: 6,019,820
[45] Date of Patent: *Feb. 1, 2000

[54] LIQUID JET COMPRESSOR

[75] Inventor: Glenn Fred Leverett, Vienna, W. Va.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/852,718

[22] Filed: May 7, 1997

[51] Int. Cl.[7] .................................................. B01D 47/10
[52] U.S. Cl. .............................. 95/216; 96/323; 261/76; 261/115; 261/DIG. 54; 417/151; 417/171; 417/196
[58] Field of Search .................... 95/216; 96/323, 96/FOR 130; 55/468, DIG. 14, DIG. 17; 261/76, 115, 116, DIG. 54; 417/76, 151, 158, 171, 178, 196

[56] References Cited

U.S. PATENT DOCUMENTS

| | | | |
|---|---|---|---|
| 2,020,850 | 11/1935 | Myhren et al. | 261/DIG. 54 |
| 2,550,683 | 5/1951 | Fletcher et al. | 261/76 |
| 2,632,597 | 3/1953 | Boeckler | 261/116 |
| 2,905,731 | 9/1959 | Seed | 261/DIG. 54 |
| 3,257,180 | 6/1966 | King | 261/76 |
| 3,385,030 | 5/1968 | Letvin | 261/DIG. 54 |
| 3,399,511 | 9/1968 | Geiringer | 261/76 |
| 3,565,091 | 2/1971 | Auger | 55/DIG. 14 |
| 3,812,656 | 5/1974 | Barnhart | 261/DIG. 54 |
| 4,056,371 | 11/1977 | Diemer, Jr. et al. | 95/216 |
| 4,149,828 | 4/1979 | Affri | 261/116 |

OTHER PUBLICATIONS

J. H. Witte, Mixing Shocks and Their Influence on the Design of Liquid–Gas Ejectors, *Dissertation*, Table 9, p. 96, Dec. 21, 1962.

*Primary Examiner*—Duane S. Smith

[57] ABSTRACT

Gas is compressed in a liquid jet compressor to high pressures, e.g. at least 7 atm, by using liquid injected under high pressure, e.g. at least 16 atm, to obtain a high velocity liquid injection into the compressor, which aspirates the gas to be compressed into the compressor.

14 Claims, 1 Drawing Sheet

LIQUID JET COMPRESSOR

FIELD OF INVENTION

This invention relates to a method for compressing gas by using a liquid to do the compression.

BACKGROUND OF THE INVENTION

Eductors have been used to generate a vacuum by compressing a gas from subatmospheric pressure to atmospheric pressure. The principle of operation of the eductor has been extended to compression of the gas to a higher pressure, notably from a starting gas at 13 psia (0.88 atm, 88.88 KPa) up to 50 psia (3.4 atm, 343.4 KPa), as disclosed in R. G. Cunningham and R. J. Dopkin, "Jet Breakup and Mixing Throat Lengths for Liquid Jet Gas Pump", Journal of Fluid Engineering, September, 1974, pp. 216–226. In this context, the eductor can be referred to as a liquid jet compressor, i.e, a liquid is used to compress the gas. As disclosed in the JOFE article, the compression of the gas occurs by the axial injection of a liquid from a nozzle under a pressure up to 165 psia (11.2 atm, 1120 Kpa). The liquid is injected along the length of a tube, which aspirates the subatmospheric pressure gas to be compressed into the tube, with the result being the breaking up of the liquid into droplets which become mixed with the gas. The tube has thus been referred to as a mixing throat. The mixture of liquid droplets then enter a zone of expanded volume, called the diffusion zone, where pressure rises at the expense of kinetic energy, i.e. the velocity of the liquid is reduced. The combination of the mixing of the droplets with the gas in the mixing throat and decrease in velocity in the diffusion zone transfers the momentum and kinetic energy, respectively, of the liquid into compression of the gas, which can then be separated from the liquid, such as by a cyclone separator, for further use.

SUMMARY OF THE INVENTION

It has been discovered that the liquid jet compressor can be operated to compress gas to much higher pressures than heretofore obtained, namely to at least 7 atm (707 KPa), and even to 25 atm (2525 KPa) and higher. Thus, the process of the present invention comprises axially injecting liquid under pressure of at least 16 atm (1616 KPa) into an aspirating tube, aspirating gas to be compressed into said aspirating tube to contact the injected liquid therein, the velocity of said liquid contacting said gas within said tube causing said liquid to break into droplets in said tube to form a mixture of said droplets and said gas, thereby transferring the momentum of said liquid to said gas, optionally passing said mixture into a zone of reduced velocity to thereby transfer the kinetic energy of said liquid to said gas, and obtaining as a result thereof compression of said gas to at least 7 atm. Most of the compression of the gas occurs in the aspirating tube, e.g. at least 85% of the compression. Use of the zone of reduced velocity for additional compression gives maximum performance of the process, but this zone can be omitted if the compression within the tube is sufficient for the intended use of the compressed gas.

DETAILED DESCRIPTION

Figure 1:
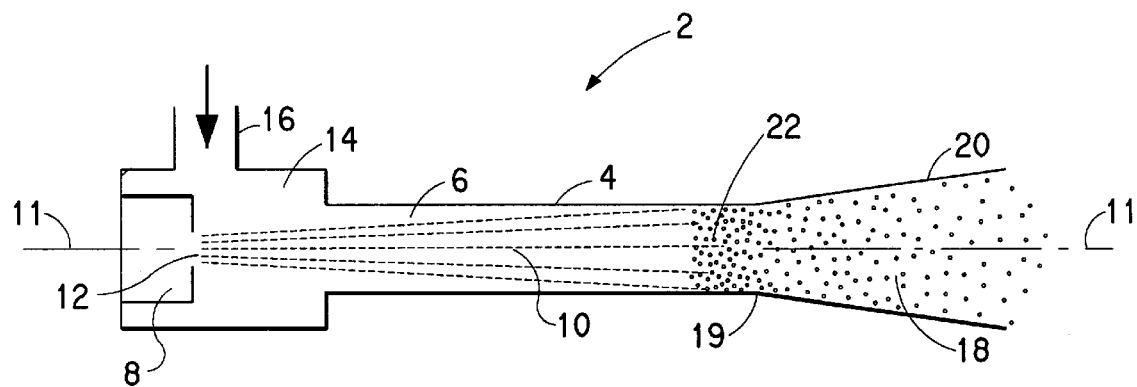
FIG. 1 is a schematic side view cross-section of a liquid jet compressor that can be used in the process of the present invention.

In FIG. 1, the liquid jet compressor 2 is composed of a hollow tube 4, the hollow interior of the tube defining the mixing throat 6 of the compressor. The diameter of the mixing throat is preferably constant along its length. A liquid injection nozzle 8 is positioned adjacent the upstream end of the tube 4, the nozzle having an orifice 12 aiming along the longitudinal axis 11 of the throat 6 (tube). Liquid is fed to nozzle 8 under high pressure such as by a pump (not shown), causing this liquid to be injected through orifice 12 and axially along the throat as a high velocity stream 10. The upstream end of the tube 4 opens into a gas manifold section 14 which is equipped with one or more inlets 16 for the gas to be compressed and which encompasses the nozzle 8 so that the injection of the liquid into the throat causes aspiration of the gas through the inlet and into the throat. The downstream end 19 of the tube (throat) opens into a diffuser 18 which is defined by an outwardly flared conical wall 20. The tube 4, manifold 14 and diffuser 18 are preferably circular in cross-section and concentric with the longitudinal axis of the tube 4. As stated above, the compressor can terminate at the downstream end 19 of the tube 4.

In operation, the liquid is fed into the nozzle for high velocity injection into the tube 4 and along its longitudinal axis. This injection causes aspiration of the gas (to be compressed) through the inlet 16, around the manifold 14 and into the throat of the tube 4 to come into contact with the injected liquid. The aspirated gas envelops the stream 10 of liquid to contact it on all sides. The result of this contact between aspirated gas and high velocity liquid stream is the breaking up of the stream into liquid droplets which form a mixture with the gas at the in the region 22 adjacent the downstream end 19 of the tube. The tube 4 is of sufficient length for the stream 10 to break into droplets prior to reaching the downstream end 19. The liquid droplet/gas mixture passes into the diffuser 18 (when present), which because of its greater cross-sectional area (volume) than the tube causes the velocity of the mixture to decrease.

Figure 2:
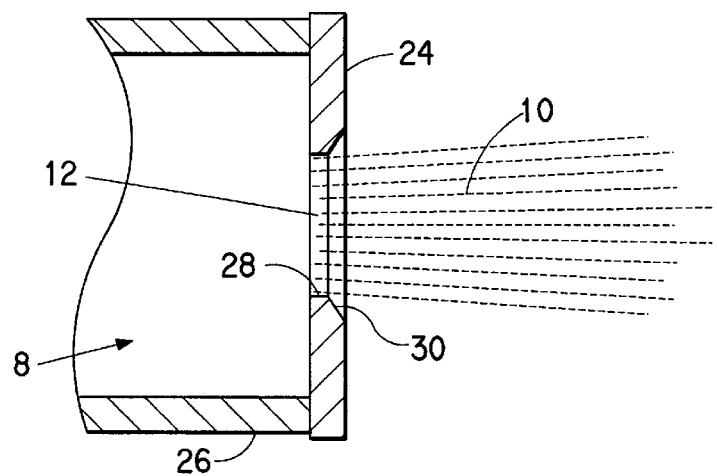
FIG. 2 is a side view in cross section of a preferred orifice for use in the compressor of FIG. 1.

FIG. 2 shows a preferred orifice configuration for orifice 12, wherein the nozzle 8 terminates in a plate 24 within which the orifice 12 is centrally located. The plate 24 is attached to the nozzle housing 26 such as by welding. The orifice 12 comprises a land area 28 which is parallel to the longitudinal axis of the tube and a connecting concentrically beveled area 30 downstream from the land area, with the result being that the land area 28 of the orifice provides a knife-like exit for the liquid stream injected from the nozzle. The width of the land area is preferably 1–3 mm. The effect of this knife-like exit is to assist the breakup of the liquid stream into droplets, so that the length of the tube (and the throat) can be minimized, thereby minimizing the loss of fluid energy as friction between the stream and the interior wall of the tube which defines the throat 6.

The majority of the compression of the gas occurs in the region 22 of the throat, with the transfer of momentum of the liquid to the gas via the liquid droplets acting on the gas, and the compression of the gas is completed in the diffuser by the resultant transfer of the kinetic energy of the liquid to the gas in accordance with Bernoulli's Theorem (kinetic energy is converted to potential energy (pressure) as the flow area increases and velocity thereby decreases). The compressed gas can then be separated from the liquid by such gas/liquid separation apparatus as a cyclone.

Compression of the gas to at least 7 atm is obtained by feeding the liquid into the tube 4 via the nozzle 8 at very high velocity into the tube, and this high velocity is obtained by imposing a high pressure on the liquid input to the nozzle. A pressure of at least 16 atm is needed to achieve this result. An example of the geometry of the liquid jet compressor for obtaining this result will be represented in the Example.

As the desired compression of the gas increases, it may be preferable to have the gas introduced into the compressor through inlet 16 be at superatmospheric pressure, such as at least 2 atm abs. (202 KPa). It is difficult to increase the pressure of the gas by the liquid jet compressor by a factor of greater than 10 times the incoming gas pressure (through inlet 16). Therefore, if compression to a pressure of greater than 20 atm. (2020 KPa) is desired, it would also be desired to increase the incoming gas pressure accordingly. Preferably, the gas pressure increase obtained by the liquid jet compressor is 4 to 8 times the incoming gas pressure. Even though the incoming gas may be under pressure, it is nevertheless under the influence of aspiration by the high velocity stream 10 which is injected along the throat 6 by virtue of the velocity of the liquid stream 10 being greater than the velocity of the incoming gas. The compression of the incoming gas can be obtained by conventional means, such as by a mechanical compressor, but also by use of a second liquid jet compressor to obtain the desired incoming gas compression. In that case the compression of gas output of the first compressor is increased in the second compressor. Additional compressors can be used in series to obtain the ultimate compression desired.

It is also preferred that the volume rate of flow of the liquid to the nozzle is such that the volume rate of flow of the incoming gas is less than three times the volume rate of flow of the liquid.

The invention is applicable to all gases, organic and inorganic, such as HCl, HBr, HF, chlorine, fluorine, aliphatic hydrocarbons such as methane, ethane and propane, olefinic hydrocarbons such as ethylene, propylene, butene, butadiene and acetylene and halogenated organic compounds such as vinyl chloride, vinyl fluoride, vinylidene fluoride, chlorotrifluorethethylene and tetrafluorethylene. The gas may contain suspended particulates, such as suspended solid particles or liquid droplets, which will be removed from the gas by contact with the liquid stream. Any liquid can be used which is compatible with the gas being compressed. By compatible is meant that that the liquid does not interact with the gas in an undesired way. Usually this will mean that the liquid will not react with the gas unless reaction is desired. It may be also desirable for the liquid to interact with a portion (component) of the gas, by either dissolving or reacting with the component, while compressing the remainder of the gas. Examples of liquids include water, aqueous mediums and organic liquids. The compression process of the present invention can also be used for cooling a gas while compressing it. Thus, the incoming gas can be at a temperature of at least 50° C., and the liquid stream cools the gas while compressing it to a temperature of less than 40° C. Upon separation of the liquid from the compressed gas, such liquid can be recycled to the circulating pump which provides the liquid fed under high pressure to nozzle 8.

The compression of gas in the process of the present invention can also involve high enough compression to cause the compressed gas to liquify (condense) in whole or part. The condensed liquid can then be separated from the liquid of stream 10 by conventional liquid/liquid separation, such as decantation when the liquids are immiscible, e.g. hydrocarbon liquid from water.

This invention is especially advantageous for highly pressurizing gases as may be desired for feeds to chemical reactions, which gases my be heat sensitive, e.g. subject to decomposition and even explosion when subjected to heat, which would be created by gas compression using other methods. The presence of the liquid in the compressor 2 cools the gas as it is compressed, making the compression virtually isothermal. Thus the compression can be carried out at temperatures below 50° C. No moving mechanical parts are present in the compressor 2, which could generate localized high temperature caused by metal-to-metal contact. When the gas is to be condensed by the compressor, there is no danger of damage to the compressor as there would be if for example the compressor were of the piston type.

EXAMPLES

In these Examples, the liquid jet compressor was made of stainless steel and had the following dimensions:

| | |
|---|---|
| Inner diameter of tube 4 (throat) | 0.546 in (1.39 cm) |
| Length of tube 4 | 15 in (38.1 cm) |
| Diameter of nozzle orifice | 0.34 in (0.86 cm) |
| Distance of nozzle orifice to throat inlet | 1.6 in (3.8 cm) |
| Diffuser diameter at discharge end | 0.742 in (1.88 cm) |
| Diffuser length | 2.5 in (6.35 cm) |

In the following Table, $C_3H_6$ is propylene, $C_2H_2$ is acetylene, TFE is tetrafluoroetheylene, and OIL is Mobil SHC-224. The liquid used to do the gas compression is at a temperature of 31–33° C.

TABLE

Experimental Details and Compression Results

| Example | 1 | 2 | 3 | 4 | 5 | 6 |
|---|---|---|---|---|---|---|
| Gas | $C_3H_6$ | HCl | HCl | $HCl/N_2$ | $C_2H_2$ | TFE |
| Inlet pres. (atm abs.) | 3 | 6.1 | 1 | 1 | 1.7 | 5.4 |
| Inlet gas temp, ° C. | 33 | 33 | 500 | 33 | 33 | 33 |
| Liquid | $H_2O$ | OIL | OIL | $H_2O$ | $H_2O$ | $H_2O$ |
| Liq. press (atm abs.) | 33.5 | 101.2 | 20.1 | 20.1 | 22.2 | 101.6 |
| (MPa) | 0.34 | 10.22 | 2.03 | 2.03 | 2.24 | 10.26 |
| Liq. Temp., ° C. | 31 | 33 | 33 | 33 | 33 | 33 |
| Liq. rate, GPM | 44 | 82 | 34 | 35 | 34 | 80 |
| $m^3$/min | 0.17 | 0.31 | 0.13 | 0.13 | 0.13 | 0.30 |
| gas rate, kg/hr | 102 | 340.5 | 9.1 | 20.1 | 27.2 | 817.2 |
| $m^3$/min | 0.33 | 0.61 | 0.25 | 0.26 | 0.26 | 0.60 |
| gas exit press. throat: | | | | | | |
| (atm. abs.) | 13.2 | 34.0 | 7.1 | 7.1 | 7.4 | 36.1 |
| (Mpa) | 1.33 | 3.43 | 0.72 | 0.72 | 0.75 | 3.65 |
| diffuser: | | | | | | |
| (atm. abs) | 13.2 | 37.4 | 7.5 | 7.5 | 8.2 | 38.4 |
| (MPa) | 1.33 | 3.78 | 0.76 | 0.76 | 0.83 | 3.88 |
| gas exit temp., ° C. | 32 | 33 | 33.2 | 33.6 | 33 | 33 |

In the experiment of Example 1, the compressed propylene is condensed in the throat because the exit temperature is below the saturation temperature at the amount of compression occurring.

Example 2 shows the compression of anhydrous HCl to high pressure using a hydrocarbon oil.

Example 3 shows simultaneous compression and cooling.

In the experiment of Example 4, the HCl/nitrogen gas mixture is 50/50 mol % of each, and the HCl is removed from the gas stream by direct contact with the water, within which the HCl is absorbed (dissolved), whereby it is the nitrogen component of the incoming gas that is compressed. The water stream injected into the throat can be replaced, for example by an aqueous base solution, in which case the HCl would react with the base to form a salt solution, thereby removing the HCl from the compressed nitrogen.

Examples 5 and 6 show isothermal compression of reactive gases—acetylene and tetrafluoroethylene.

The Examples also show that most of the compression (over 85%) takes place in the throat 6 of the tube 4.

What is claimed is:

1. A method comprising the steps of axially injecting liquid under pressure of at least 16 atm into an aspirating tube, aspirating reaction gas to be compressed into said tube to contact the injected liquid therein, the velocity of said liquid contacting said gas within said tube causing said liquid to break up into droplets in said tube to form a mixture of said droplets and said gas, thereby transferring the momentum of said liquid to said gas, optionally passing said mixture into a zone of reduced velocity to thereby transfer the kinetic energy of said liquid to said gas, and obtaining as a result thereof compression of said gas to at least 7 atm.

2. A method of claim 1 wherein said gas aspirated into said tube is under a pressure of at least 2 atm.

3. A method of claim 1 wherein the volume ratio of said gas being aspirated into said tube to said liquid is less than 3:1.

4. A method of claim 1 wherein said aspirating gas is compressed to at least 25 atm.

5. A method of claim 1 wherein said gas includes a component which interacts with said liquid, whereby said compression is of the remainder of said gas.

6. A method of claim 5 wherein said component dissolves in said liquid.

7. A method of claim 5 wherein said component reacts with said liquid.

8. A method of claim 1 wherein said gas contains particulates which are removed from said gas by said liquid.

9. A method of claim 1 wherein said gas is at a temperature of at least 50° C. and said liquid contacting said gas cools said gas to a temperature of less than 40° C. during said compression.

10. A method of claim 1 wherein the injection of said liquid is through an orifice having an edge and a downstream beveled portion.

11. A method of claim 1 wherein said reactive gas is selected from the group consisting of halogen acid gases, halogen gases, aliphatic hydrocarbon gases, olefinic hydrocarbon gases and halogenated organic compound gases.

12. A method of claim 2 wherein said reactive gas is a feed to a chemical reaction.

13. A method of compressing a gas feed to a chemical reaction comprising the steps of axially injecting liquid under pressure of at least 16 atm into an aspirating tube, aspirating gas to be compressed into said tube to contact the injected liquid therein, the velocity of said liquid contacting said gas within said tube causing said liquid to break up into droplets in said tube to form a mixture of said droplets and said gas, thereby transferring the momentum of said liquid to said gas, passing said mixture into a zone of reduced velocity to thereby transfer the kinetic energy of said liquid to said reactant gas, and obtaining as a result thereof compression of said reactant gas to at least 7 atm.

14. A chemical process comprising the steps of compressing a reactant gas by axially injecting liquid under pressure of at least 16 atm into an aspirating tube; aspirating reactant gas to be compressed into said tube to contact the injected liquid therein, the velocity of said liquid contacting said gas within said tube causing said liquid to break up into droplets in said tube to form a mixture of said droplets and said gas, thereby transferring the momentum of said liquid to said gas and passing said mixture into a zone of reduced velocity to thereby transfer the kinetic energy of said liquid to said reactant gas, and obtaining as a result thereof compression of said reactant gas to at least 7 atm; and passing said compressed reactant gas into a chemical reaction.

* * * * *